(12) United States Patent
Loxley

(10) Patent No.: US 6,273,135 B1
(45) Date of Patent: Aug. 14, 2001

(54) FUEL FLOW CONTROL APPARATUS

(75) Inventor: Russell A Loxley, Coalville (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/556,006

(22) Filed: Apr. 20, 2000

(30) Foreign Application Priority Data

May 29, 1999 (GB) .................................................. 9912557

(51) Int. Cl.⁷ .................................................. F02C 7/232
(52) U.S. Cl. .................... 137/625.62; 251/29; 251/31; 251/25; 244/135 R
(58) Field of Search .................. 251/29, 25, 28, 251/30.01, 31; 137/625.62; 244/135 R

(56) References Cited

U.S. PATENT DOCUMENTS 4,265,272 * 5/1981 Klimowicz et al. ............ 137/625.62
5,427,350 * 6/1995 Rinkewich ........................ 251/31 X

FOREIGN PATENT DOCUMENTS 2256729   12/1992  (GB) .

* cited by examiner

Primary Examiner—Kevin Lee
(74) Attorney, Agent, or Firm—W. Warren Taltavull; Manelli Denison & Selter PLLC

(57) ABSTRACT

A high pressure fuel system includes tapped high pressure flows (22,24) with restrictors (44,46) to provide low pressure flows with which, via a valve (50) to enable either a low pressure flow to bias a main, high pressure fuel cut off valve (16) to close at a steady given rate, or a high pressure flow across a further valve (30), to close the valve (16) at a faster rate.

5 Claims, 1 Drawing Sheet

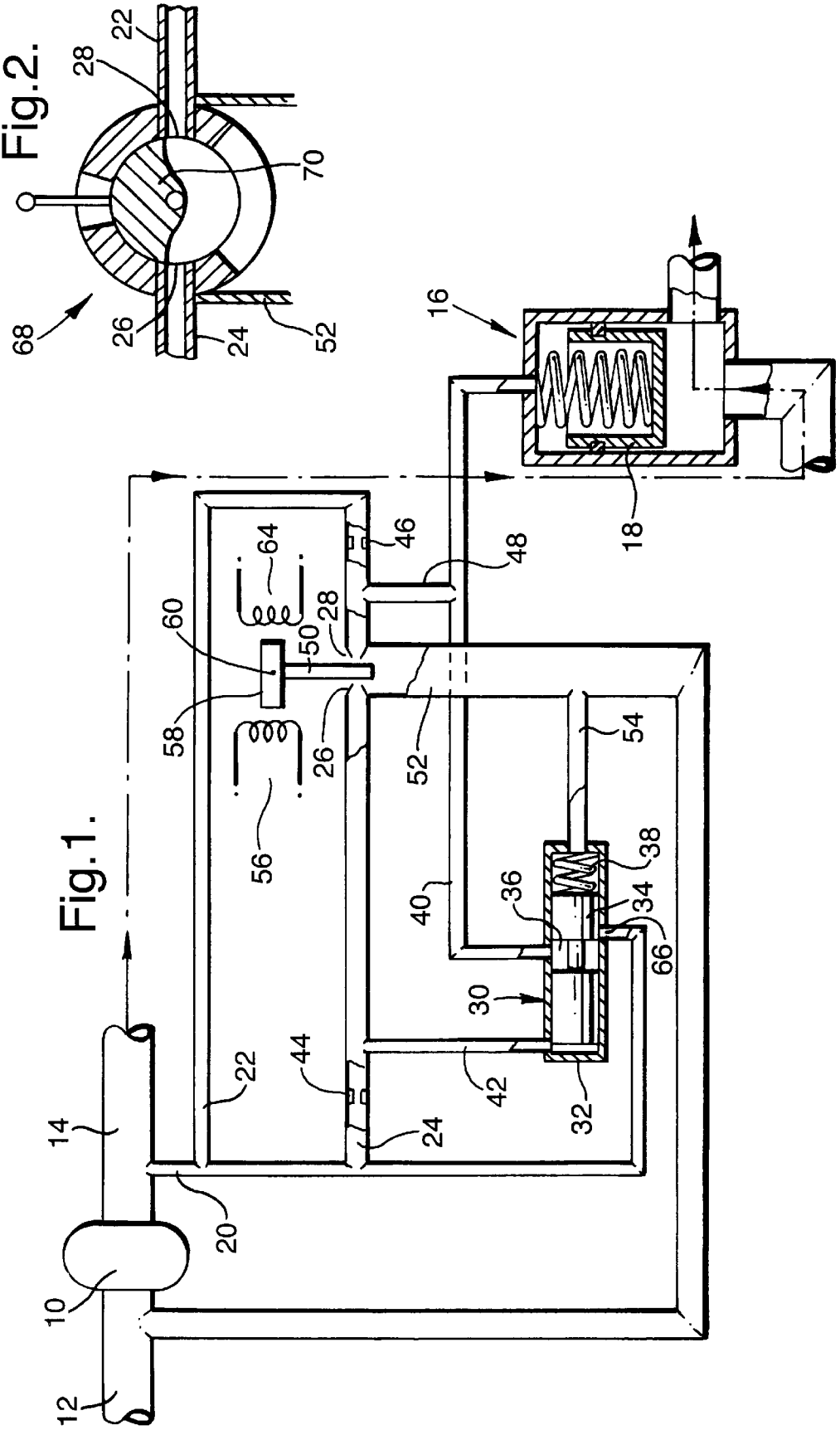

FUEL FLOW CONTROL APPARATUS

FIELD OF THE INVENTION

The present invention relates to the control of a high pressure flow of fuel to combustion equipment.

BACKGROUND OF THE INVENTION

When fuel is burned to create an expanding gas, and the forces generated thereby are utilised to rotate a turbine, or to drive a piston, which in turn rotates a crankshaft, a situation called overspeed can develop. It is then necessary to obviate the flow of fuel to the combustion zone as quickly as possible, so as to avoid mechanical damage to the associated powerplant. This means that it is desirable to provide fuel shut off capability which will satisfy both normal and abnormal running speeds of the apparatus being driven.

It is known, to take a plurality of tappings from the high pressure fuel system, and provide each tapping with an outlet and a dedicated blocking device, with which to selectively block the outlet as and when appropriate. This is in order to achieve the fuel flow control as described hereinbefore, so as to protect the associated driven apparatus. It is an object of the present invention to provide an improved fuel flow control apparatus.

SUMMARY OF THE INVENTION

According to the present invention, in a main, high pressure fuel system including fuel flow cut off means, wherein fuel flows tapped from said system are connected to said cut off means and utilised to apply differing main flow cut off rates by said cut off means, a single, tapped fuel flow blocking device positioned between tapped flow outlets and selectively movable to block one or other of said outlets, the arrangement being such that blocking of one said outlet effects a low pressure fuel flow to said main fuel flow cut off means to move it into the high pressure fuel line to close it, and blocking of said other outlet effects a high pressure fuel flow to said fuel cut off means, to move it more rapidly into said high pressure fuel line than said low pressure fuel flow, to close it.

BRIEF DESCRIPTION OF THE DRAWINGS

The invention will now be described, by way of example and with reference to the accompanying drawings in which:

FIG. 1 a diagrammatic layout of a high pressure fuel system incorporating a single, tapped flow blocking device in accordance with the present invention.

FIG. 2 is an alternative single, tapped flow blocking device in accordance with the present invention.

DETAILED DESCRIPTION OF THE INVENTION

Referring to FIG. 1, a fuel pump 10 receives fuel from a low pressure fuel supply (not shown) via a line 12. The pump 10 raises the fuel pressure to a high value and forces it along line 14, partly illustrated in chain dotted arrow form, to and past a fuel cut off valve 16, whereafter, the fuel reaches combustion equipment (not shown). The piston 18 of valve 16 is spring loaded in a direction across the fuel flow, but the spring 19 is rated such that during normal operation of an associated powerplant (not shown), a fuel pressure holds the valve 16 open.

In order to provide selective boost biasing of the valve 16 so as to close it when desired, a tapping 20 is taken from line 14, at a position adjacent the outlet of pump 10. Two further tappings 22 and 24 are taken from tapping line 20 and have outlet nozzles formed at their end extremities, numbered 26 and 28 respectively. Tapping 22 is extended and shaped so that the outlet nozzles 26 and 28 oppose each other in spaced relationship.

Tapping 20 is extended and connects to a spool valve 30, at about the mid point thereof. The spool valve 30 consists of a cylinder 32, containing a piston 34, which has a reduced diameter central portion 36, as is known per se, and during normal running and stopping of the associated powerplant (not shown), a spring 38 urges the piston 34 to the left hand end of cylinder 32, as viewed in the drawing. High pressure fuel is thus prevented from crossing the valve 30, into a further line 40, which is in fuel flow connection with the interior of the piston 18 of valve 16.

A further tapping 42, this from tapping line 24, connects high pressure fuel to the left hand end of valve 30, but in the operating conditions described immediately hereinbefore, has no affect on the position of valve 30, as is depicted in FIG. 1.

A restrictor 44 is positioned in tapping line 24, upstream of the tapping point of line 42 and, and a further restrictor 46 is positioned in tapping line 22, upstream of nozzle outlet 28 and a line 48, which connects tapping line 22 with line 40, valve 16 and valve 30. Restrictors 44 and 46 serve to drop the high pressure of the fuel flow from pump 10, to a lower pressure, for reasons which are explained hereinafter.

The design of the apparatus described herein, is such as to selectively enable a flow of low pressure fuel to the interior of valve 16, so as to boost the spring bias load, and so shut off the high pressure fuel flow to the powerplant (not shown) in a normal manner, and alternatively, should overspeed occur by relevant rotating parts in the powerplant (not shown), to enable a flow of high pressure fuel to the interior of valve 16, so as to boost the bias of the spring by a magnitude which will achieve a relatively rapid shut off of the flow of high pressure fuel to the powerplant (not shown). These modes of operation are achieved by the provision of a reed valve 50, a free end of which, when not actuated, is positioned between and equi distant from, nozzle outlets 26 and 28.

When the powerplant (not shown) is running normally, the reed valve 50 stays centrally of the space between outlets 26 and 28. The fuel flow is then such, that high pressure fuel flows through line 20, to the spool valve 30, where it is prevented from crossing spool valve 30, and via lines 20, 24 and 42, to the spool valve 30, where it is again stopped, and has no affect thereon. Simultaneously, the high pressure fuel flows, via line 20, along lines 22 and 24, and respective restrictors 44 and 46, at which point, its pressure drops to a relatively low level.

The outlet nozzles 26 and 28 are connected in flow series with a low pressure fuel return line 52, and via a tapping line 54, to the spring loaded end of spool valve 30. The pump 10 sucks low pressure fuel out of nozzles 26 and 28, through line 52, to the inlet side thereof.

Whilst the recirculatory system described immediately hereinbefore is operating, the pump 10 sends high pressure fuel to combustion equipment via line 14 and valve 16. However, should it be desired to stop operation of the powerplant (not shown), the electrical winding 56 of a stator pole (not shown) is activated to generate a magnetic force on the ferrous head 58 of the reed valve 50. This results in the reed valve 50 pivoting about an axis 60, in an accurate manner, to block low pressure fuel outlet 28. The low pressure fuel flow in line 22 is thus barred from return line 52, and instead, flows via line 40 to the interior of valve 16 where, in combination with the spring therein, forces the piston 18 across line 14, to close it against the high pressure fuel flow, and thereby stops the powerplant.

In the event that overspeed occurs in the powerplant, during its otherwise normal operation, it is necessary to cut off the fuel supply more rapidly than is achievable by use of low pressure fuel as described hereinbefore. In the present example, rapid shutdown is achieved by electrically energising the winding 64 of a further stator pole (not shown) which is arranged in opposition to the winding 56. The reed valve 50 is thus caused to pivot to block outlet 26. Low pressure fuel from restrictor 44 is thus prevented from entering return line 52, and the resulting back pressure in line 24 diverts fuel therefrom, into line 42, with a force sufficient to move the piston 34 of spool valve 30 to the right as viewed in FIG. 1, against the resistance of the spring 38. The high pressure fuel is assisted in this, by the suction action of the pump 10 generating a relatively low pressure in lines 52 and 54.

Movement of the piston 34 as described hereinbefore, aligns space 36 with the outlet 66 of high pressure fuel line 20, and consequently, high pressure fuel therefrom flows across the valve 30, into line 40, and thus to the interior of valve 16, with a force sufficient to slam piston 18 across, the high pressure fuel line 14, and thereby obviate drive to the rotary members (not shown) of the powerplant (not shown), which then freewheels to a stop.

Stator devices are unavoidably bulky, heavy structures. If the invention described and claimed in this specification is used to control a group or ship mounted powerplant (not shown), such characteristics may not be a drawback. However, if the invention is used to control a powerplant mounted in an aircraft, wherein the achievement of the lowest possible weight commensurate with safety is paramount, it may then be desirable to substitute another device, with which to selectively block outlets 26 and 28.

Referring now to FIG. 2, a rotary valve 68 is substituted for the reed valve 60 and associated stator windings 56, 64 of FIG. 1. Low pressure fuel flows into both sides of valve 68, and then enters line 52, to be sucked back to the pump 10, (not shown in FIG. 2). When it is desired to stop the associated powerplant (not shown) in the normal manner, the central portion 70 of valve 68 is rotated, by any suitable means (not shown) in a clockwise direction, as viewed in FIG. 2, so as to block outlet 28. Low pressure fuel from line 20 is then prevented from being sucked back to the pump 10, but is diverted to the valve 16 (not shown in FIG. 2) exactly as described with respect to FIG. 1.

When it is desired to slam shut valve 16, because an overspeed condition has arisen in an associated powerplant (not shown), the central portion 70 of valve 68 is rotated anti clockwise as viewed in FIG. 2, so as to block outlet 26 and thus prevent low pressure fuel from line 24 entering line 52. A back pressure results, by virtue of the fuel in line 24 now being unable to pass through restrictor 44, and fuel at tapped high pressure flows down line 42, to move piston 34, as described with respect to FIG. 1.

Actuation of either valve described hereinbefore can be achieved manually, by an operator or a pilot, when a normal stopping procedure is required. However, when overspeed occurs, a speed sensing device, of which many types are known, may be used. The device would observe, preferably electronically, the speed of rotation of the relevant parts, and on sensing the occurrence of a speed more than a pre-set maximum, would send a signal to the valve actuation apparatus (not shown) to actuate the valve, so as to shut valve 16.

What is claimed is:

1. In a main, high pressure fuel system including fuel flow cut off means, wherein fuel flows tapped from said system are connected to said cut off means and utilized to apply differing main flow cut off rates by said cut off means, a single, tapped flow blocking device positioned between tapped flow outlets and selectively movable between a first position in which said flow blocking device blocks one of said outlets and a second position in which said flow blocking device blocks the other of said outlets, the arrangement being such that blocking of one said outlet effects a low pressure fuel flow to said main fuel flow cut off means to move the flow into the high pressure fuel line to close, the high pressure fuel line, and blocking of said other outlet effects a high pressure fuel flow to said fuel cut off means, to move the flow more rapidly into said high pressure fuel line than said low pressure fuel flow, to close said low pressure fuel line, said blocking device comprises a reed valve, one end of which lies between opposing tapped fuel outlets, in spaced relationship therewith and the other end of which comprises a magnetically permeable head mounted for pivotable movement so as to enable accurate movement of said one end into blocking relationship with a selected one of said outlets, and a stator motor including a pair of opposed, wire wound poles between which said head lies, so that energizing of an appropriate one of said windings will effect said pivoting thereof.

2. A main, high pressure fuel system including a single, tapped fuel flow blocking device as claimed in claim 1 and including a further valve connected to receive but prevent a said tapped high pressure fuel flow to said cut off means until said tapped fuel flow blocking means blocks that said fuel flow outlet which effects a high pressure fuel flow to said cut off means, and thereby cause a back pressure in the tapped, high pressure fuel system so as to move said further valve such that said tapped, high pressure fuel flow is passed to said cut off means, to close it.

3. A powerplant including a main, high pressure fuel system as claimed in claim 1.

4. An aircraft powered by a powerplant including a main, high pressure fuel system as claimed in claim 1.

5. In a main, high pressure fuel system including fuel flow cut off means, wherein fuel flows tapped from said system are connected to said cut off means and utilized to apply differing main flow cut off rates by said cut off means, a single, tapped flow blocking device positioned between tapped flow outlets and selectively movable between a first position in which said flow blocking device blocks one of said outlets and a second position in which said flow blocking device blocks the other of said outlets, the arrangement being such that blocking of one said outlet effects a low pressure fuel flow to said main fuel flow cut off means to move the flow into the high pressure fuel line to close, the high pressure fuel line, and blocking of said other outlet effects a high pressure fuel flow to said fuel cut off means, to move the flow more rapidly into said high pressure fuel line than said low pressure fuel flow, to close said low pressure fuel line, wherein said blocking device comprises a rotary valve positioned between tapped fuel flow outlets and rotatable between a position wherein it is in flow series with both of said outlets a position in which it is in flow series with one of said outlets and a position in which it is in flow series with the other of said outlets.

* * * * *